Figure 1:

United States Patent [19]

Irvine

[11] 4,274,879

[45] Jun. 23, 1981

[54] SYNTHETIC BONE ASH

[75] Inventor: George D. Irvine, Greenock, Scotland

[73] Assignee: Tate & Lyle Limited, London, England

[21] Appl. No.: 156,052

[22] Filed: Jun. 3, 1980

Related U.S. Application Data

[63] Continuation of Ser. No. 16,951, Mar. 5, 1979, abandoned.

[51] Int. Cl.$^3$ .................. C01B 15/16; C01B 25/26; C04B 35/00
[52] U.S. Cl. ...................................... 106/39.5; 106/45; 423/305; 423/311
[58] Field of Search .................. 106/39.5, 45; 423/305, 423/307, 308, 309, 311

[56] References Cited

U.S. PATENT DOCUMENTS

| 3,027,229 | 3/1962 | Towey et al. ................ 423/309 |
| 3,379,541 | 4/1968 | Tuvell ...................... 106/286 X |
| 4,097,935 | 7/1978 | Jarcho ..................... 106/39.5 X |
| 4,195,366 | 4/1980 | Jarcho ..................... 106/39.5 X |

Primary Examiner—Helen M. McCarthy
Attorney, Agent, or Firm—Ostrolenk, Faber, Gerb & Soffen

[57] ABSTRACT

Hydroxyapatite suitable for incorporation as a synthetic bone ash in a "bone" china body is produced by continuously contacting a stream of a slurry of hydrated lime with a stream of at least about 60% by weight phosphoric acid at an approximately stoichiometric ratio of 10 $Ca(OH)_2$ to 6 $H_3PO_4$ and a temperature of from about 80° to about 85° C. at a controlled reaction mixture of pH of from about 9.0 to about 11.0 and then calcining at a temperature of at least 1,000° C.

13 Claims, 2 Drawing Figures

SYNTHETIC BONE ASH

This is a continuation of application Ser. No. 16,951, filed Mar. 5, 1979 now abandoned.

This invention relates to a synthetic bone ash for use in the production of bone china, and a process for its production.

Bone china (otherwise known as English China) has for many years been of great importance in the ceramic industry, providing a high degree of whiteness, reflectivity and translucency which, together with its characteristic "ring", contribute to its aesthetic appeal. The material is also of high strength, producing a fired strength of up to 2000 lb/in$^2$. The high strength of bone china is apparently derived from the good thermal expansion match between the glass bond and the crystal matrix, and from the relatively small particle size of the crystals.

Bone china is traditionally produced from a mixture of bone ash (produced by calcining degelatinized bone, for example produced by glue factories), china clay and a stone flux. The traditional recipe for bone china is 50% by weight bone ash, 25% by weight china clay and 25% by weight cornish stone.

An increase in the bone ash concentration renders the china more expensive but improves the whiteness, translucency and fired strength. Higher bone ash contents also increase the plasticity of the mix before firing, to a certain extent. However, decreasing proportions of bone ash below 50% generally lead to a poorer colour and a reduction in translucency, strength and plasticity.

Bone ash represents an expensive portion of the bone china mix and the price of bone ash has risen in recent years for a variety of reasons. Also the quality and the availability of bone ash can vary, causing difficulty in obtaining a standard product. Replacing a proportion of the bone ash by other materials such as bentonite and ball clay produces a distinctly inferior product. The colour is affected by metallic traces in the additives and the translucency is greatly impaired. There is thus a need for a synthetic replacement so that bone china can be produced economically without reducing the standard.

Bone ash as used in the ceramic industry comprises a sintered form of hydroxyapatite. This compound is necessary for bone china production since it combines with the clay and stone to provide the necessary translucent vitrified body and the sintered structure is also necessary to provide the necessary physical structure.

Phosphate rock in the form of apatite is mined in large quantities in various parts of the world and is generally used in the production of fertilisers. However, when this rock is calcined it produces tricalcium phosphate which cannot easily be included in a bone china mix as it reduces the workability of the system so that additions of plasticiser are necessary, and it is far less efficient in providing the necessary structure in the fired product.

It has been proposed to produce a synthetic bone ash using pure phosporic acid and calcium carbonate (Rao and Boehm, J. Dent. Res., 1974, 1351-1354), but such a process has been considered uneconomic and would not compete favourably with bone ash. Previous work (Gee, Proc. Tech. Sess. Bone Char, 1953, 337-352) suggested that hydroxyapatite could be formed over a wide range of pH values and temperatures by reaction of very dilute hydrated lime solutions with monocalcium phosphate solutions. It was also suggested that for a low degree of pyrophosphate formation on calcining, a calcium to phosphate ratio higher than that of pure hydroxyapatite is required. Indeed, it had even been suggested that hydroxyapatite itself gave β-tricalcium phosphate on being calcined (Neuman and Neuman, Chemical Dynamics of Bone Mineral).

Additionally, the hydroxyapatite must have an appropriate crystal structure and size in order to provide the desired vitrified ceramic material, and processes for the production of hydroxyapatite tend to produce material which has crystals which are much too small.

The particle size can be increased by sintering the material, for example at a temperature of at least 700° C. However, in order to provide a hydroxyapatite material suitable for inclusion in bone china, we have found that it is necessary that the content of orthophosphate in the hydroxyapatite is kept as low as possible and certainly below 5% by weight. We have found that higher proportions of orthophosphates lead to the production of β-tricalcium phosphate on sintering, and the presence of this material is disadvantageous in bone china production.

We have now found that pure hydroxyapatite can be produced by controlled reaction of lime and phosphoric acid to produce a material which has less than 5% by weight of orthophosphate. This material can then be calcined to give a sintered product free from β-tricalcium phosphate.

The process comprises continuously contacting a stream of a slurry of hydrated lime with a stream of at least 60% by weight phosphoric acid at an approximately stoichiometric ratio of 10 Ca(OH)$_2$ to 6 H$_3$PO$_4$ and a temperature of from 80° to 85° C. at a controlled reaction mixture pH of from 9.0 to 11.0. A slurry of about 10 to 30% by weight of hydrated lime is preferred. Also a pH of no more than 10.5 is advantageous.

The separated material can then be calcined at a temperature of at least 1000° C. to give a sintered, particulate product which can be substituted for milled bone ash in bone china bodies.

The reaction process is most conveniently effected as a continuous addition process, whereby the lime and the phosphoric acid are simultaneously and continuously introduced into a reactor in the required proportions, with vigorous mixing. In this way, the pH is kept at the required constant value. This is in contrast with the situation that arises when one reactant is added to a bulk quantity of the other, when the pH changes considerably over a finite period. The lime is conveniently added as a suspension of about 15 to 20% by weight concentration, while the phosphoric acid is preferably used at a concentration of from 80 to 90% by weight. Conveniently, the flow of lime slurry may be maintained constant and the acid flow adjusted to control the pH.

The residence time for the reaction can be important. It is desirable that the free Ca$^{++}$ (as Ca(OH)$_2$) in the product is kept as low as possible and the crystals produced at the required size. We have found that, in general, a residence time of up to 90 minutes is advantageous, particularly 60-90 minutes.

It is also important that the mixture is very efficiently stirred and that the pH is monitored at the reaction site itself.

The temperature at which the hydroxyapatite is calcined is of great importance. As stated above, a temperature of at least 1,000° C. is necessary and calcining temperatures even higher than this are preferred. In general, it can be stated that the higher the calcining temperature is above 1,000° C., the less the material will contract on firing. In general, a calcining temperature of at least 1150° C., preferably at least 1200° C., is desirable. It will be understood that in the production of traditional bone ash, bones are calcined at a much lower temperature, e.g. of the order of 800° C.

The hydroxyapatite may be calcined by any suitable process, provided the correct temperature is obtained. In a preferred embodiment of the process, the hydroxyapatite is calcined by being passed through a rotating tube calciner lined with refractory material and inclined to the horizontal. A residence time of about one hour has been found to be suitable, but longer residence times may be used.

It is particularly desirable that the heating of the material should be gradual and not abrupt. We have found that the longer the time taken to reach the calcining temperature, the larger the particles or crystallites produced. In a preferred process, the material is heated at a 200° C. per hour to 1050° C. and is then held at this temperature for 1 hour.

Hydroxyapatite obtained according to the invention can be incorporated in a traditional bone china mix to constitute 50% by weight of the mix together with 25% by weight of each of china clay and cornish stone to provide a body which can be fired in the usual way to provide a ceramic "bone" china possessing a translucency and general aesthetic appeal equal to that of the traditional material. Furthermore, the open pores are reduced to virtually zero at a firing of 1240° C. and remains at that level at higher temperatures. Closed pores are remarkably constant over a wide range of temperatures and typically a range of 51° C. can be obtained. This range is very large when compared with ordinary bone china materials and is highly desirable.

Another characteristic in which bone china made from a mix containing calcined hydroxyapatite according to the present invention is superior to the traditional product is the the so-called firing range. The range in centrigrade degrees over which the bulk density of the ceramic drops by 0.5 g/cc from its mixture value is known as the firing range and use of the calcined hydroxyapatite in the mix can give a range of 30° C. This compares very favourably with a firing range in the low twenties, the value normally achieved with traditional bone china.

The hydroxyapatite must be produced using lime and phosphoric acid which have the required degree of purity. Thus, the starting materials should be free of any metal ions which might lead to a coloured ceramic body being produced. Generally speaking the material obtained should be pure white, although we have found that very pure samples can exhibit a distinct blue coloration.

The following Example illustrates the invention:

EXAMPLE 1

A 20% suspension of lime and a 90% solution of phosphoric acid were reacted at a temperature of from 80° to 85° C. in two runs, one at a controlled pH of 9.5, the other at a controlled pH of 10.5. The residence times were 88 and 71 minutes respectively. Products were obtained which contained 98.5 and 99.5% hydroxyapatite, respectively.

BRIEF DESCRIPTION OF FIGS. 1 AND 2

The product obtained by such a reaction process is illustrated in FIG. 1 attached. FIG. 1 represents a photograph of the reaction product at a magnification of 78,000x (at A4 size) and was obtained by electron microscopy of a thin section of an epoxy block.

Figure 2:
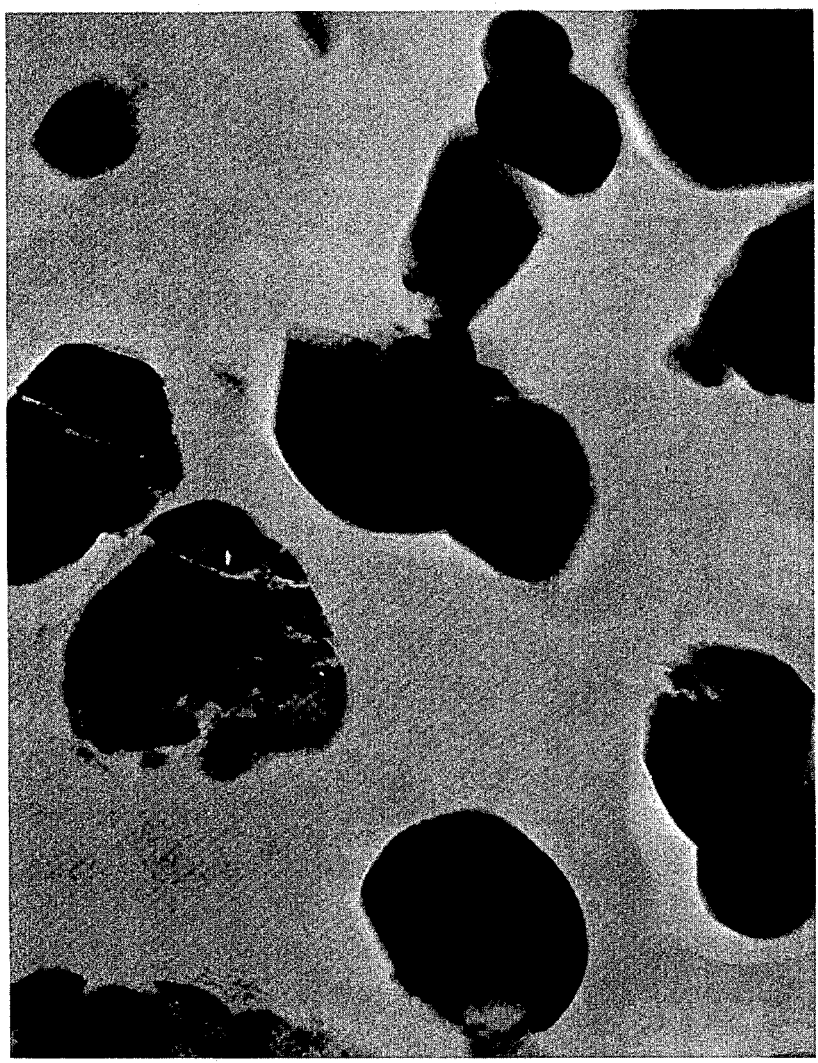

The calcined product obtained from such a reaction product at a temperature of about 1050° C. is illustrated in FIG. 2 attached.

This figure is a similar electron microscopy photograph at the same degree of magnification. It will be seen that the crystal size is increased from an initial crystal length of about 0.035 $\mu$m to a roughly spherical crystallite with a diameter of approximately 0.5 $\mu$m.

Samples of bone china produced by substituting the calcined material for bone ash in the traditional 50:25:25 formula, exhibited good colour, translucency and strength and, in particular, a very good firing range.

COMPARISON EXAMPLE 1.

Similar reactions to those of Example 1 were effected at pH values of 5.5 and 8.5 to give products having a hydroxyapatite content of only 45 and 88% respectively.

Experiments were also effected at 25° C., but very high pH values were required which were difficult to control and gave products of insufficient purity.

I claim:

1. A process for producing a hydroxyapatite which has less than 5% by weight content of orthophosphates which comprises contacting a stream of a slurry of hydrated lime with a stream of at least about 60% by weight phosphoric acid at an approximately stoichiometric ratio of 10 Ca(OH)$_2$ to 6 H$_3$PO$_4$ at a temperature of from about 80° to about 85° C. at a controlled substantially constant reaction mixture pH value which is in the range of from about 9.0 to about 11.0 by continuously introducing said streams into and withdrawing the resulting mixture from a reaction zone wherein the precipitated particulate hydroxyapatite resulting from said contacting is separated from said reactants and wherein the residence time in said reaction zone is up to 90 minutes.

2. A process according to claim 1, in which the the lime is added as a suspension of about 10 to about 30% by weight concentration.

3. A process according to claim 1, in which the maximum pH is 10.5

4. A process according to claim 2 in which the lime is added as a suspension of 15 to 20% by weight concentration.

5. A process according to claim 1 wherein the phosphoric acid is of a concentration from 80 to 90% by weight.

6. A method for making a synthetic bone ash for use in "bone" china, which comprises contacting a stream of a slurry of hydrated lime with a stream of at least about 60% by weight phosphoric acid at an approximately stoichiometric ratio of 10 Ca(OH)$_2$ to 6 H$_3$PO$_4$ and a temperature of from about 80° to about 85° C. at a substantially constant controlled reaction mixture pH value which is in the range of from about 9.0 to about 11.0 by continuously introducing said streams into and withdrawing the resulting mixture from a reaction zone and then separating the precipitated particulate hydroxyapatite and calcining it at a temperature of at least 1,000° C.; and wherein the hydroxyapatite has less than 5% by weight content of orthophosphates and the residence time in said reaction zone is up to 90 minutes.

7. A method according to claim 6 in which the calcining temperature is at least 1150° C.

8. A method according to claim 6 in which the hydroxyapatite is calcined by being heated at a rate of about 200° C. per hour to about 1050° C. and is then held at this temperature for about 1 hour.

9. A method according to claim 6 in which the hydroxyapatite is calcined by being passed through a rotating tube calciner lined with refractory material and inclined to the horizontal.

10. A "bone" china body comprising up to 50% by weight of synthetic bone ash obtained by the method of claim 6 together with about 25% by weight each of china clay and a stone flux.

11. A ceramic "bone" china obtained by firing a body as claimed in claim 10.

12. A process according to claim 1 in which said streams are free of metal ions which might lead to a colored ceramic body being produced when said product is thereafter used in "bone" china.

13. A process according to claim 7 in which the calcining temperature is at least 1200° C.

* * * * *